May 19, 1970  E. H. FLETCHER  3,512,495
SELECTIVELY CONNECTABLE BOAT AND BARGE
Filed Oct. 20, 1966  6 Sheets-Sheet 1

FIG. 1

INVENTOR.
Edwin H. Fletcher
BY
George H. Baldwin
ATTORNEY

United States Patent Office 3,512,495
Patented May 19, 1970

3,512,495
SELECTIVELY CONNECTABLE BOAT AND BARGE
Edwin H. Fletcher, Jacksonville, Fla., assignor to United States Freight Company, New York, N.Y., a corporation of Delaware
Filed Oct. 20, 1966, Ser. No. 588,162
Int. Cl. B63b 3/02, 21/00
U.S. Cl. 114—235   36 Claims

ABSTRACT OF THE DISCLOSURE

The combination of an independent powerless cargo carrying watercraft and an independent powered watercraft for pushing the cargo carrying watercraft with the cargo carrying watercraft having a well in its stern portion and the bow portion of the powered watercraft being disposed within the well. Additionally the combination includes selectively operable means disposed between the well and the bow portion for connecting the powered watercraft to the cargo carrying watercraft to provide a positive force transmitting connection therebetween during both forward and reverse movement of the powered watercraft. The means connecting the powered watercraft to the cargo carrying watercraft may include yieldable means to permit some, but limited, universal movement between the powered watercraft and the cargo carrying watercraft.

---

This invention relates to an articulated ship, that is, a ship consisting of two separate units; a cargo carrying unit and a power unit, and when the units are properly coupled together they form a complete ship having a certain amount of controlled articulation therebetween.

More particularly, the invention pertains to a linkage for connecting a first watercraft in a pushing relationship with a second watercraft such as a tugboat and a barge for the purpose of having the tugboat push the barge. This type of connection is also known as a thrust coupling between the cargo carrying unit and the power unit of a two unit ship, and permits a certain amount of controlled articulated motion between the two units, but excludes rolling and horizontal swinging of one unit in relation to the other unit.

It is customary for tug boats to tow vessels either by the tow being forward of the tug boat and being connected by a thrust coupling or by the tow being aft of the tug boat and connected to it by a hawser. In the former case the tug boat and the tow are close coupled, whereas in the latter case the tow is separated from the tug boat by a substantial distance. The former type of relationship between the tug boat and tow has substantial advantages over the latter arrangement.

When the tow is ahead of the tug boat and connected to it by a thrust coupling the tow is much more controllable by the coupling enabling the tug boat to turn the tow more quickly and through sharper angles and enabling a tug boat to stop the tow quickly and even reverse the movement of the tow is necessary. Moreover, the combination of the tug boat and tow connected by a thrust coupling is much more compact to enable the tug boat and tow to maneuver in close quarters. Also it is not necessary for the tug boat and tow to change relationship when leaving or approaching port.

When the tow is connected aft of the tugboat by a hawser it is often times necessary to shorten the towing line which is very time consuming and leaves the tow temporarily uncontrolled so that it is subject to being moved out of the desired position by wind, current or tide. Especially if the sea is running, the control of a line connected tow by the tug boat is more difficult particularly during the line shortening operation. Moreover, a vessel towed aft of the tug boat connected by a line particularly if the line is long may encounter forces setting up a yawing oscillation. Skegs may be provided on the tow to resist displacement or sway but such skegs increase resistance to forward movement of the tow. Higher speeds of the tug boat and tow are therefore possible when the tow is ahead of the tug boat and connected to it by a thrust coupling. Additionally, location of the tow ahead of the tug boat removes it from the wash of the propellers which produce additional resistance to movement of the tow. The operating efficiency of the tow and tug boat combination where the tow is ahead of the tug boat is thus greater and the operating cost is lower.

The combination of a tow ahead of the tug boat is much safer than the combination of a tug boat with the tow trailing behind the tug boat and connected to it by a hawser. Particularly if the line or hawser is slack it is subject to fouling, and if it trails in the water additional resistance to movement of the combination is produced. Especially at night or in fog the hawser between the tug boat and its tow cannot be seen and it is difficult to see such hawser at other times so that there is danger to ships travelling on an intersecting course. If the tow line should be cut between the tug boat and the tow the derelict tow immediately becomes a navigation hazard. Also severe damage may be caused to a small boat encountering a heavy tow line.

For these and other reasons it is very desirable for the tow to be located ahead of the tug boat and close-coupled to it, but in such relationship it is essential that the coupling between the tug boat and the tow be such as to enable the tug boat to maneuver the combination effectively.

In many countries, including the United States, river barges operating in comparatively smooth water are pushed by tug boat instead of being pulled by tug boats. In fact a tremendous volume of goods is moved in this manner. While pushing operations have sometimes been attempted in bays and sounds and other bodies of moderately rough water these pushing operatoins have not been successful and to an even greater extent, open ocean operations have not been successful. When operating in waves and rough water, the tug boat and the barge tend to move relative to each other. If the tug boat and barge are tied together so as to prevent this relative movement, large strains are placed on the gear and equipment. Due to these strains, the tying together of the tug and the barge has generally been unsuccessful. Further, prior to this invention, satisfactory linkages have heretofore not been available which would permit the necessary degree of relative movement while at the same time imposing a degree of restraint necessary to permit the tug to propel and control the barge while in a pushing relationship with the barge.

With this foregoing knowledge of tug boats, the invention herein pertains to a connecting linkage whereby a tug boat may effectively push a large barge in rough, open water, and yet, which connecting linkage allows certain freedom of movement to thus reduce the strain imposed on the linkage.

One of the advantages of the invention is that a tug boat in a pushing relationship with respect to a large barge can exercise better control over the barge with respect to stopping and provide greater maneuverability especially in narrow channels and harbors because of the semi-rigid connection between the tug boat and the barge. Additional advantages of and objects accomplished by this invention include: no resistance to a tow line dragging in the water as the tow line has been eliminated; a barge may be used which has a relatively low resistance to movement through water as compared with towed barges which have relative high resistance to movement through water as a towed barge must be formed to resist yaw or swerve from side to side; the tug can maintain closer surveillance over the barge because of the close connection between the tug boat and the barge; in rough water the tug boat is afforded protection from waves as the barge proceeds ahead of the tug boat and as a result the tug boat may maintain speed for a longer period of time in rough weather conditions as compared with the tug boat towing the barge; there is no danger of losing the towed barge because of a flexible tow line, as there is no tow line; an expensive complicated towing wench and auxiliary gear on the tug boat is not required as there is no tow line; the time and effort lost in shortening the tow line upon entering the harbor or restricted water area is eliminated; greater propulsive efficiency is provided by the articulated tug-barge combination than in a towed barge arrangement; greater safety and protection are afforded the tug and crew, especially in bad weather, with the articulated arrangement; electric power can be supplied to the barge in this combination while it would be unfeasible to do so if the barge were towed aft of the tug; lower insurance rates are attainable for the cargo on the thrust-coupled barge; a substantial decrease in the size of the crew required is obtainable in a barge-tug combination as compared to a single vessel of comparable size and cargo capacity; the cost is reduced when compared to a single vessel of comparable size and cargo capacity; and there is much more room for cargo storage on the barge of the articulated combination than on a single vessel of comparable size incorporating both storage and propulsive units as no crew quarters, no machinery or equipment are necessary on the barge of the articulated unit.

From the above, it is therefore a general object of the present invention to provide a thrust coupling between a tow ahead of a tug boat and such tug boat which will be deformable in a manner and to an extent which will enable the tow and the tug to move relative to each other sufficiently to greatly reduce the stress on the coupling when such vessels are in a sea, yet which will enable the tug boat to maintain adequate control over the tow and to propel the tow effectively.

Another general object of this invention is to provide a thrust coupling for connecting a tow and a tug boat in close coupled relationship which is simple, compact and sufficiently rugged to withstand stresses produced by the tendency of the two vessels connected to move relative to each other.

A further general object of the subject invention is to provide such a thrust coupling for connecting a tow and a tug boat which can be disconnected quickly from the tow in case of damage to the tow or an emergency should arise.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

In this invention the cargo carrying unit of the two unit tug-barge system is formed with a notch in its stern into which notch the bow of the power unit is fitted and is connected therein to the barge through the thrust coupling of the invention. The thrust coupling includes two power operated essentially horizontal cylindrical pins which are moveable from their housings within the bow of the tug into specially designed adjustable receiving blocks or trunnions built into the inner side stern wings of the barge notch.

Figure 1:
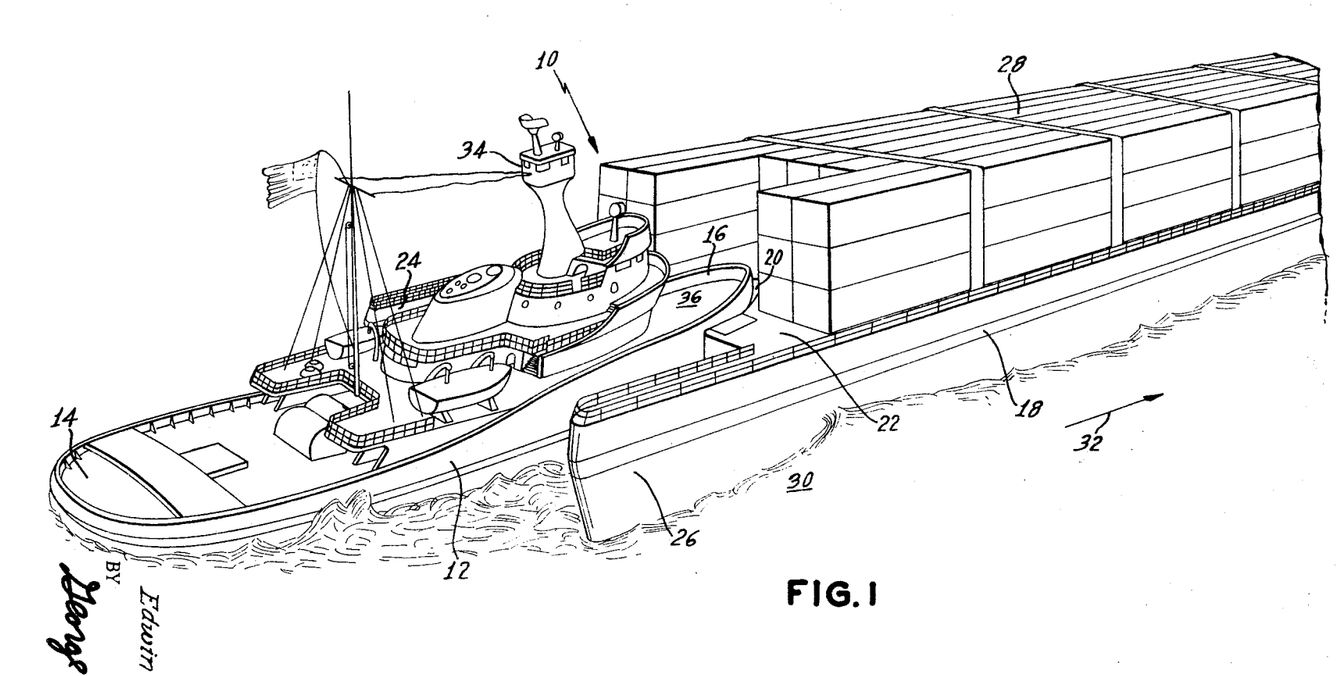
FIG. 1 is a perspective view of the articulated tug-barge arrangement of this invention.

Referring to the drawings in detail now, and in particular to FIG. 1 thereof, the articulated tug-barge arrangement of this invention generally designated by reference numeral 10 is shown in perspective therein. The tug 12 of the combination includes a stern portion 14 and bow portion 16. The large, ocean-going barge 18 of the combination is formed with a notch or well 20 in its stern portion 22, a pair 24 and 26 of rearwardly extending stern wings, and has a full deep-sea ship bow (not shown) which gives it substantial advantages over other types of ocean-going barges. Barge 18 shown in FIG. 1 is adapted and arranged for a containerized freight 28 operation, but could also be so arranged and adapted to accommodate other types of cargo or cargo carrying containers such as other small barges. The combination is meant to move along in the water 30 in the direction of arrow 32 with the tug 12 pushing the barge 18 through the thrust coupling of the invention. The tug 12 is so designed that its pilot house 34 is of a sufficient height above the deck 36 thereof such that a line of sight from the pilot house will be above the freight stacked in containers 28 on the barge 18. If so desired, the articulated, pin-connected arrangement of this invention can be controlled from a pilot-house or even an elevated pilot house (not shown) forward on the barge to thus further increase the safety and reliability of the system. This type of forward control would be particularly helpful in close quarters, such as when the articulated ship is in passage in rivers, lakes, inland tributaries and the like, and when in ports and harbors.

Figure 2:
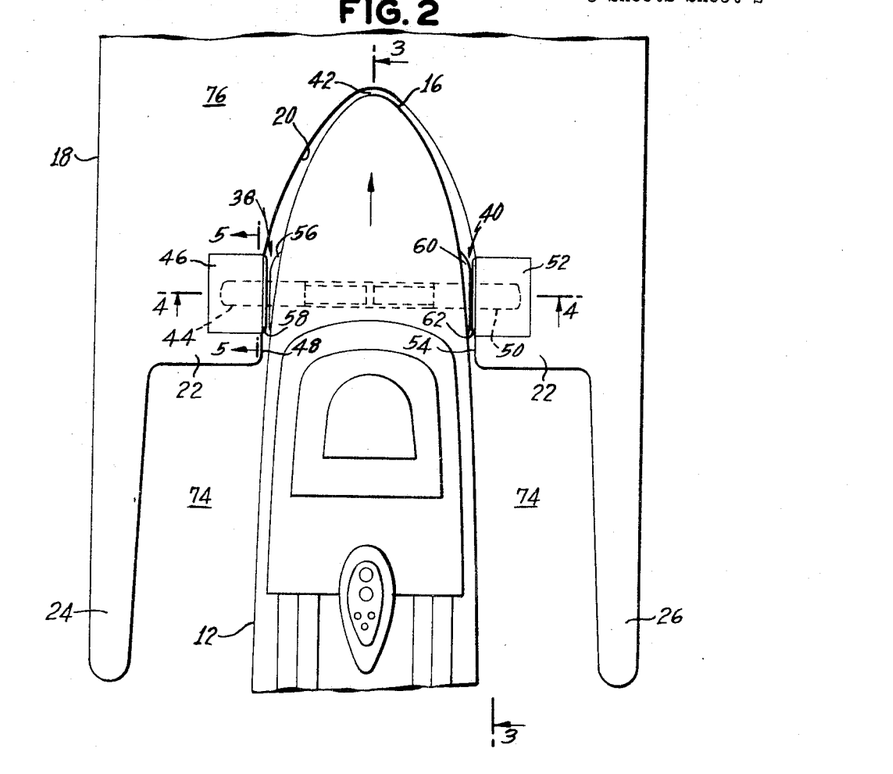
FIG. 2 is a partial top plan view of the tug-barge combination, certain portions thereof being broken away, illustrating the connection between and the positioning of the units when connected together.

The articulated barge-tug arrangement of this invention is joined by a pair of coupling connector arrangements 38 and 40, one of which 38, is on the port side of the tug 12 and the inner port side of the notch 20 within the barge 18, and the other of which 40, is in the starboard side of the tug and inner starboard side of notch 20 of the barge. When the articulated arrangement is properly coupled together by couplings 38 and 40, the bow portion 16 of the tug 12 fits within the notch 20 in the stern portion 22 of barge 18, but does not bump or touch the same, leaving a small gap or opening 42 between the two units, as depicted in FIG. 2. The notch 20 of the barge is so formed and constructed so as to permit the barge to be pushed by any standard type tug in the conventional manner when need be or when so desired.

The coupling arrangement at 38 includes a sliding reciprocal cylindrical pin 44 within the port side of the tug and a mating and receiving housing or channel member 46 built into the inner port side wall 48 of notch 20 within the barge stern. Sliding pin 44 can be extended from the tug to engage in the receiving mechanism in housing 46 of the barge to thereby connect this side of the tug with the respective side of the barge. Similarly, coupling 40 includes a sliding reciprocal cylindrical pin 50 within the starboard side of the tug and a mating and receiving housing or channel member 52 built within the inner starboard side wall 54 of notch 20 within the barge stern portion 22. Sliding pin 50 is likewise extendable from the tug to engage within the housing 52, thereby connecting the starboard side of the tug to the respective side of the barge. Both of the pins 44 and 50 are retractable from their engaged positions within the respective receiving arrangements 46 and 52 to disconnect tug 12 from the barge 18.

A blister or bubble 56 is formed on the port side of the tug 12 surrounding the pin 44 to act as a reinforced mating surface with a similar blister-like pad 58 formed surrounding the open front 59 of the receiving housing 46 on wall 48 of the barge 18. In like manner, a similar blister or bubble 60 is provided on the starboard side of the tug 12 surrounding sliding pin 50 to act as a reinforced mating surface with a similar blister-like pad 62 formed adjacently around the receiving opening 63 within the housing 52 on the inner side wall 54 of barge 18. When tug 12 is properly mated and joined to the barge 18 a very small clearance, generally in the nature of ½ inch, will exist between the mating surfaces, such as at 56 and 58, and 60 and 62. The flat sides of pads or mating surfaces 56 and 58, and 60 and 62 between the tug and barge are maintained in a lubricated condition by an appropriate grease under pressure to eliminate wear at these points. The restrictive clearances between the mating surfaces of the tug and barge prevents an over concentration or any excessive concentration of loading in the pins 44 and 50 and the receiving housings 46 and 52 of the articulated connection between the tug and barge.

Figure 3:
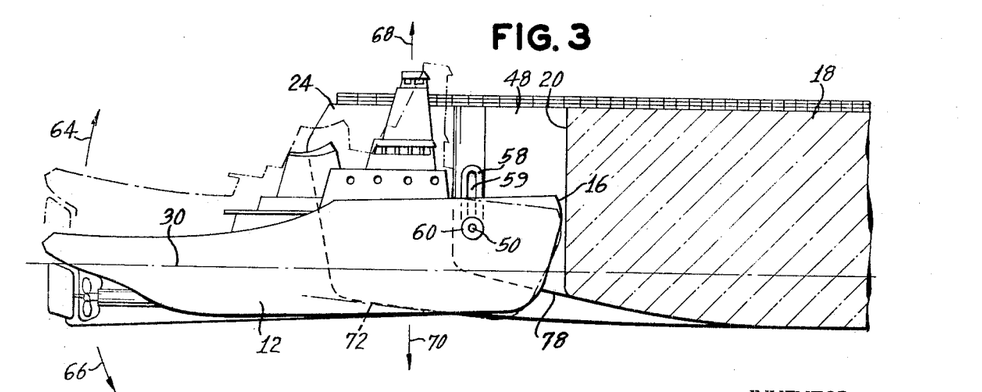
FIG. 3 is a partial cross-sectional view along the line 3—3 of FIG. 2.

When the tug 12 is properly coupled or connected to the barge 18 through the thrust coupling of this invention the two units are not completely rigid with respect to each other, but are capable of certain limited relative movement with respect to each other, see FIG. 3. Tug 12 when coupled to the barge 18 is rotatable about connecting pins 44 and 50 in the direction of arrows 64 and 66. Additionally the tug is limitedly movable with respect to the barge in the vertical direction as indicated by arrows 68 and 70 of FIG. 3, which movement will be explained more fully hereinafter. These limited relative movements between the barge and tug permit the combination to operate safely and effectively in a body of water subject to wave action, such as the open sea, while at the same time permitting the tug to effectively and efficiently propel the large ocean going barge through the water with a high degree of safety to the tug and its crew and with a high degree of control and maneuverability of the barge itself.

The extended stern wings 24 and 26 of the barge are built to extend deep into the water, as depicted in FIG. 3 at reference numeral 72 indicating the bottom or baseline of stern wing 24. The stern wings 24 and 26 are thus constructed to afford directional stability and control to the barge and to protect and afford safety to the tug 12 and its crew during a high or rough sea by providing a sheltered type of harbor 74 for the tug when pin connected. When it is desired to or when it becomes necessary to tow the barge on a towline or hawser behind the tug, stern wings 24 and 26 provide the barge with directional stability without the usual and additional barge skegs required with other types of deep-sea barges, thereby stabilizing the barge without any added resistance to forward movement of the barge in the water as would be imparted by the usual barge skegs. The deep stern wings 24 and 26 additionally provide a protected area 74 therebetween where smaller barges (not shown) may be loaded on the large barge 18 when the same is anchored in a harbor or bay with the tug 12 disconnected therefrom. The loading of the smaller barges from the protected area 74 onto the large barge 18 could be accomplished by a large movable crane (not shown) mounted on the deck 76 of the barge and movable therefrom along the stern wings 24 and 26 out and over the protected area 74 from which the smaller barges can be lifted by such crane and placed within the hold or upon the deck of the large barge 18.

As seen in the drawings, the rearwardly extending wings 24 and 26 have respective inner and outer walls which are substantially parallel and which are continuous and smooth, at least throughout the underwater portions thereof, whereby the flow of water along the walls of the wings is non-turbulent. If the wing walls are not substantially parallel to the direction of water flow therealong, the water will break away from the walls thereby causing undesirable turbulence and reducing or destroying the directional stabilizing effect of the wings and, of course, increasing drag. The maximum permissible angle of a wall to the direction of water flow to avoid turbulence is related to the relative speed of the vessel through the water but this angle should be no more than one or two degrees if possible. Such small angles are herein intended to be included in the term "substantially parallel."

The hull 78 of barge 18 in the vicinity of notch 20 slopes upward, similar to other heretofore known barges, such that when the barge 18 is pushed in a forward direction 32 there exists a uniform and high velocity water movement within the notch 20, which, when presented to the tug 12 aids in the propulsive efficiency of the articulated two-unit combination. Extended stern wings 24 and 26 of the barge also give extreme directional stability to the wake flow of the barge, the effect of which is to greatly enhance the efficiency of the propellers of the barge by producing a more unified and stabilized wake flow.

Figure 4:
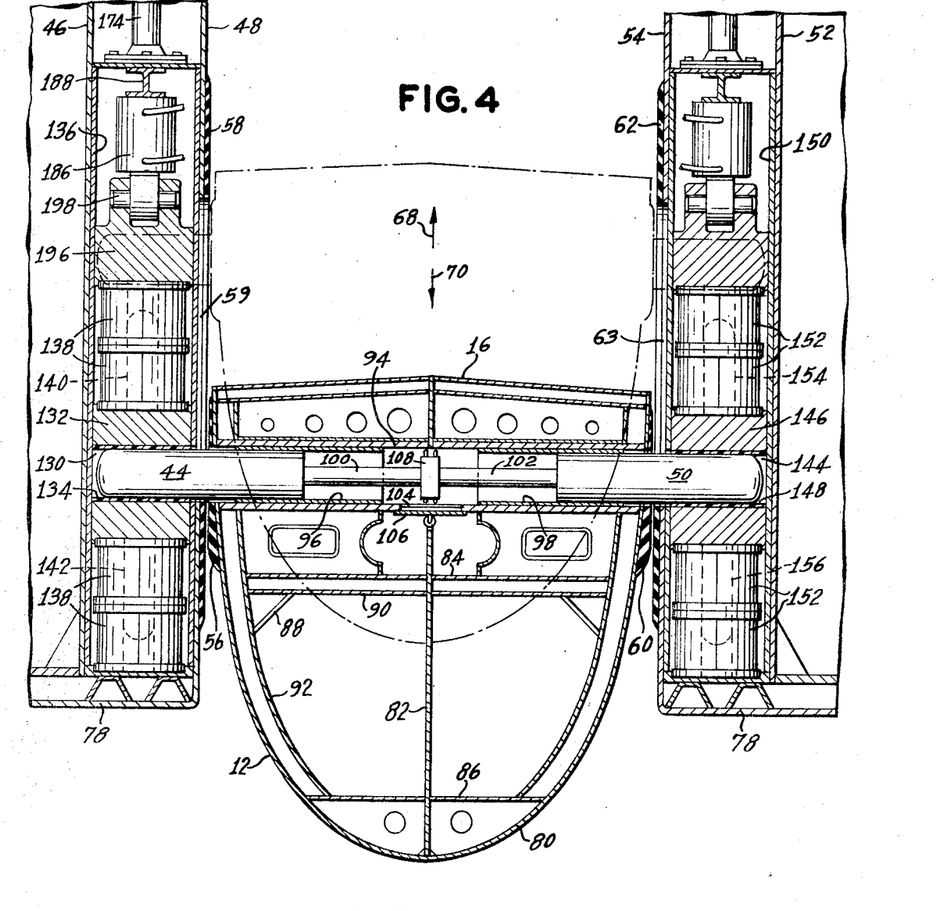
FIG. 4 is an enlarged cross-sectional view along line 4—4 of FIG. 2.

The thrust coupling between the tug and barge is shown in detail in FIG. 4, wherein bow portion 16 of the tug 12 is seen to include hull 80, bulkhead 82, deck 84 and other supporting, bracing and reinforcing members such as at 86, 88, 90 and 92. Sliding pins 44 and 50 are shown in their extended positions engaging or mating within their respective housings 46 and 52 contained within respective inner walls 48 and 54 of the notch within the barge. Movable connecting pins 44 and 50 are contained within and are completely retractable into a housing 94 within the bow portion of the tug. Each end of the housing 94 is provided with means such that when the pins 44 and 50 are completely retracted within the housing, the ends thereof may be sealed to prevent water from entering the same. When pins 44 and 50 are retracted into housing 94 and the ends thereof sealed, the sides of the tug become flush and tug 12 can be used in the conventional manner without requiring special adjustments and without any projecting appendages. Each of the pins 44 and 50 is constructed of stainless steel or steel that is chromium plated to better resist the weather and the salt water to which they become exposed during use. The pins 44 and 50 fit within stainless steel or chrome plated sleeves 96 and 98 respectively within the housings 94. Each of the pins is extended and retracted by means of a hydraulic cylinder, which is in turn controlled from pilot house 34 such that the pins can be engaged and disengaged automatically from the pilot house in a matter of a few seconds. Hydraulic cylinder 100 controls the movement of pin 44 and cylinder 102 operates pin 50. Housing 94 is provided with an access opening 104 and a closure 106 therefor, such that access can be had to the hydraulic cylinders and hydraulic mechanisms within the housing.

Figure 20:
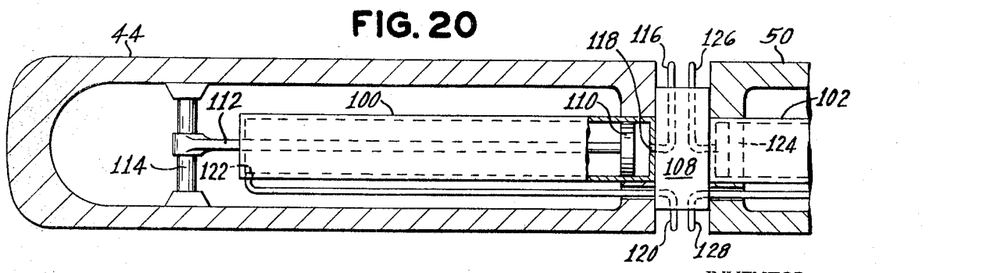
FIG. 20 is an enlarged cross-sectional view of one of the pin connectors between the articulated tug and barge of this invention.

The movement of sliding pin 44 is controlled by its hydraulic cylinder 100 which is mounted to block 108 within the housing 94, see FIG. 20. The piston 110 of hydraulic cylinder 100 is connected to the sliding pin 44 through a piston rod 112 and connecting rod 114. The pin 44 is extended by pressuring hydraulic line 116 connected to hydraulic cylinder 100 through orifice 118 within the cylinder wall and the pin is retracted by pressuring hydraulic line 120 connected to the cylinder through orifice 122 in the wall thereof. Similarly, movable pin 50 is controllable through its hydraulic cylinder 102 having a piston 124 therein and connected to the pin through a piston rod and connecting rod. The movement of pin 50 is controlled through hydraulic lines 126 and 128.

When extended, pin 44 engages within a circular opening 130 within a trunnion or receiving block 132 within housing 46 of the barge 18. Opening 130 has an inner sleeve or lining 134 of hard rubber, Teflon, nylon, other hard plastic or other like hard material, to permit the pin which is non-rotatable as to the tug to move and rotate freely within the opening 130, thereby affording free rotatable movement in a vertical plane between the barge and tug. The hard rubber or plastic 134 is maintained in a lubricated state by the salt water to which it is continuously exposed thereby permitting free movement and rotation of the pin 44 within the opening 130.

Trunnion or receiving block 132 is mounted within a slide, cage or housing 136 which is also movable in a vertical direction within channel member or housing 46 to allow for extreme changes in the draft of the barge due to heavy loading thereon. The cage 136 can be adjusted to accommodate the articulated arrangement to any degree of loading and change in draft. Trunnion 132 is movable in a vertical direction within the slide or cage 136 to permit some relative vertical movement between the tug 16 and barge 18. When the combination moves over a body of water subject to wave action, the trunnion with the pin of the tug engaged therein moves in what is described as an oscillating motion. This oscillating motion is somewhat restrained or dampened by rubber energy absorption cells 138 both above and below the sliding trunnion 132. While two such rubber energy absorption cells are used both above and below the trunnion 132, in the embodiment shown, more or less may be used if so desired. When two or more cells are used as in the embodiment depicted, a guide 140 connected to the top of the trunnion runs through the center of the energy absorption cells 138 to maintain them in alignment and a similar guide 142 connected to the bottom of the trunnion 132 functions in a like manner for energy cells 138 below the trunnion. As has been previously mentioned, housing 46 which contains the cage or slide 136 and its internal elements including trunnion 132, is contained and mounted within the port inner side wall 48 of the notch 20 and adjacently above hull 78. It is of course realized that the housing 46 is sealed from the rest of the barge to prevent leakage of water through the housing and into the barge.

When movable pin 50 is extended it engages within circular opening 144 within trunnion 146 which has an inner lining or bushing 148 of hard rubber or plastic. Trunnion 146 is movable in a vertical direction within a slide or cage 150 which is mounted within the housing 52. The oscillatory vertical movement of trunnion 146 can be absorbed or dampened through the rubber energy cells 152 positioned within cage 150 both above and below the trunnion. Again when more than one rubber energy absorption cell is used either above or below the trunnion a guide is provided extending through the center of the energy absorption cells to maintain them in alignment, such as guide 154 attached to the top of trunnion 146 and guide 156 attached to the bottom thereof.

When the barge and tug of the articulated ship of this invention are properly coupled together the blisters or pads 56 and 58 and also 60 and 62 are often in rubbing contact, therefore a forced lubrication is maintained between these smooth, contoured edged blisters and pads using an appropriate heavy grease.

The housing 52, containing cage 150 which includes therein trunnion 146 and energy absorption cells 152, is sealingly mounted and contained within the inner starboard side wall 54 of notch 20 adjacently above hull 78, such as to prevent the sea water from entering barge 18 upon passing into and through housing 52.

Figure 5:
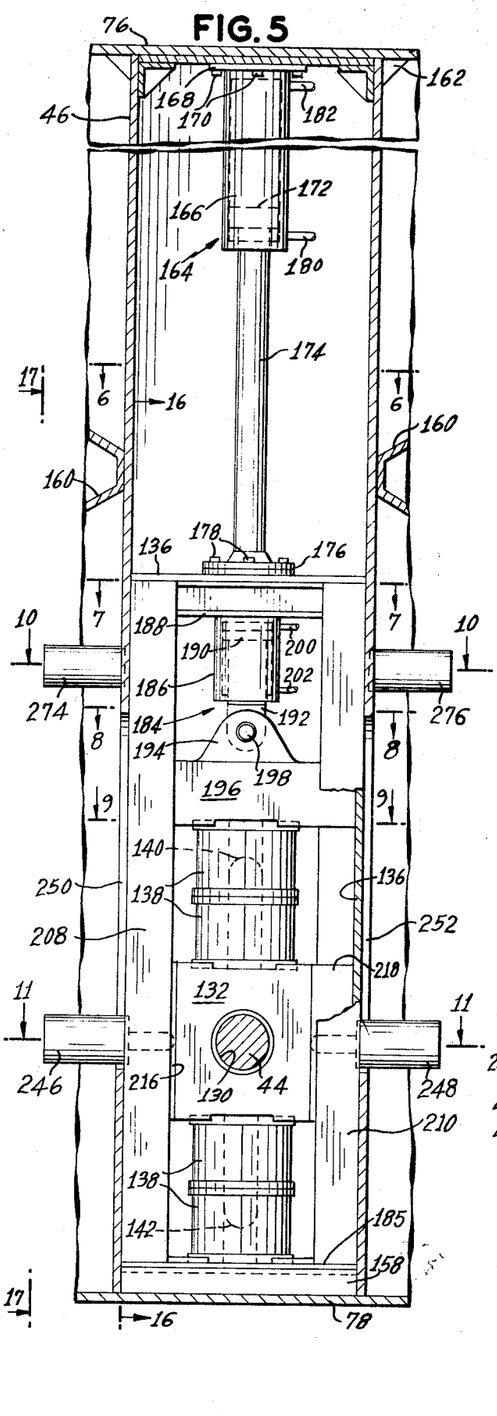
FIG. 5 is an enlarged transverse sectional view along line 5—5 of FIG. 2.
Figure 6:
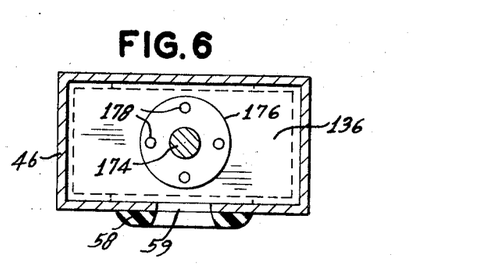
FIG. 6 is a cross-sectional view along line 6—6 of FIG. 5.

In detailed reference to FIG. 5 now, the housing 46 is shown mounted between the upper deck 76 of the barge and the hull 78 thereof, using appropriate supporting and bracing members such as at 158, 160 and 162. As has previously been stated, receiving block or trunnion 132 is movable in a vertical direction within the slide or cage 136, and slide 136 with its entire contents is movable in a vertical direction within the housing 46 to adjust for extreme changes in draft of the barge due to a heavy loading thereof, such as with a metal ore. Slide 136 is adjustable upward and downward within housing 46 by employing a hydraulic mechanism 164 contained within the housing 46 and mounted to the underside of the top thereof and additionally connected to the top of the cage 136. Hydraulic mechanism 164 includes a hydraulic cylinder 166 mounted to the underside of the top of housing 46 and to the deck 76 through flange 168 by means of bolts 170. Contained within cylinder 166 is a hydraulic piston 172 and connected thereto is a piston rod 174 which is connected to the top of cage 136 through flange member 176 by means of bolts 178, see FIG. 6. Cage 136 is raised within the housing 46 by employing hydraulic line 180, and is likewise lowered by the use of hydraulic line 182. While the mechanism 164 used to lower and raise slide or cage 136 within the housing 46 is a hydraulic arrangement, other types of devices could be employed to move the slide 136, such as a screw-jack device.

Figure 7:
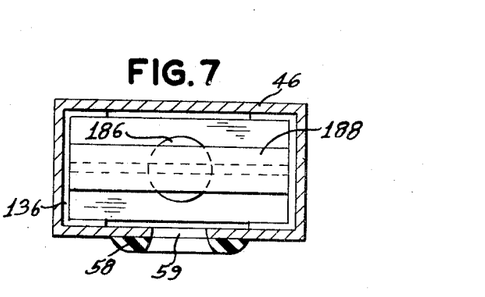
FIG. 7 is a cross-sectional view along line 7—7 of FIG. 5.
Figure 8:
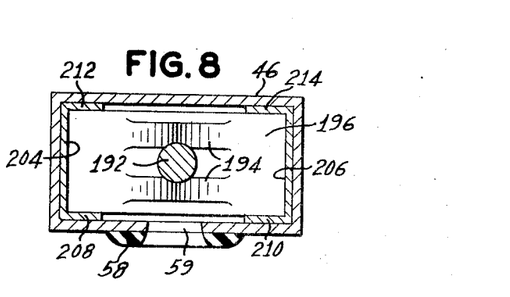
FIG. 8 is a cross-sectional view along line 8—8 of FIG. 5.

Still with detailed reference to FIG. 5, and as previously described hereinabove, receiving block or trunnion 132 is movable in a vertical direction within slide 136 and when the articulated combination is traversing a body of water subject to wave action the trunnion 132 tends to oscillate vertically within the slide. The oscillations of trunnion 132 are dampened, reduced or somewhat minimized by the use of energy absorption cells, such as the rubber energy absorption cells 138 used above and below trunnion 132 in the embodiment of the invention as depicted in FIG. 5. To further dampen or restrain the vertical motion or movement of trunnion 132, a prestressing or dampening device 184 is provided within the upper portion of cage 136 and attached thereto. By employing the prestressing device 184, energy absorption cells 138 can be compressed, between the bottom 185 of the slide 136 and the stressing mechanism 184, thereby reducing their give or resiliency to thus limit to a greater extent the vertical oscillatory motion of trunnion 132 within the slide 136. Prestressing mechanism 184 includes a hydraulic cylinder 186 attached at its upper end to cross piece or H-channel 188 extending between the side walls of cage 136, see FIG. 7. Hydraulic cylinder 186 is equipped with a piston 190, to which is attached by one of its ends a piston rod 192, the other end of which is attached to a harness arrangement 194 on top of a pressuring block 196 by means of pin 198, in this connection see in particular FIG. 8. Rubber energy absorption cells 138 are prestressed by pressurizing hydraulic line 200 and are released by pressurizing hydraulic line 202. The prestressing mechanism 184 could be other than a hydraulic arrangement, for instance a screw jack type of device could be employed in place thereof.

Prestressing block 196 is movable in a vertical direction within the confines of slide 136 to pressurize or prestress the rubber energy absorption cells 138 used above and below trunnion 132. Block 196 is lubricated and moves between the side walls 204 and 206 of the cage 136 and between its partial front wall portions 208 and 210 and its partial back wall portions 212 and 214, as more clearly depicted in FIG. 8.

Trunnion or connecting pin receiving block 132 is lubricated to slide vertically between the walls 204 and 206 of the slide or cage 136 and is further equipped with replaceable wear strips or plates 216 and 218 on its contacting ends. Wear plates 216 and 218 are arranged to be readily replaceable when the movement of and friction between the trunnion 132 and the inner sides of slide 136 cause the plates 216 and 218 to wear sufficiently creating undesirable play between the block and the slide.

Figure 9:
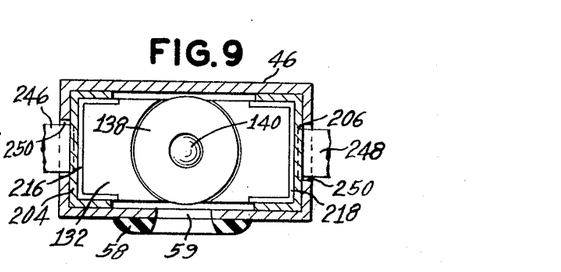
FIG. 9 is a cross-sectional view along line 9—9 of FIG. 5.

Previously described guide 140 attached to the top of trunnion 132 and extending upwardly therefrom to the center of energy absorption cells 138, see FIGS. 5 and 9, is constructed such that the same can be telescoped upon itself should it be desired to prestress or dampen energy absorption units 138, using mechanism 184, to the point where the height of the guide 140 is greater than the height of the energy absorption cells above the trunnion. Guide 142 attached to and extending outward from the lower surface of the trunnion 132 is constructed in a like manner, such that it can be telescoped on itself should its dimension be greater than the compressed dimension of the energy absorption units 138 below the trunnion 132.

Figures 10, 11, 12, 13, 14, 15:
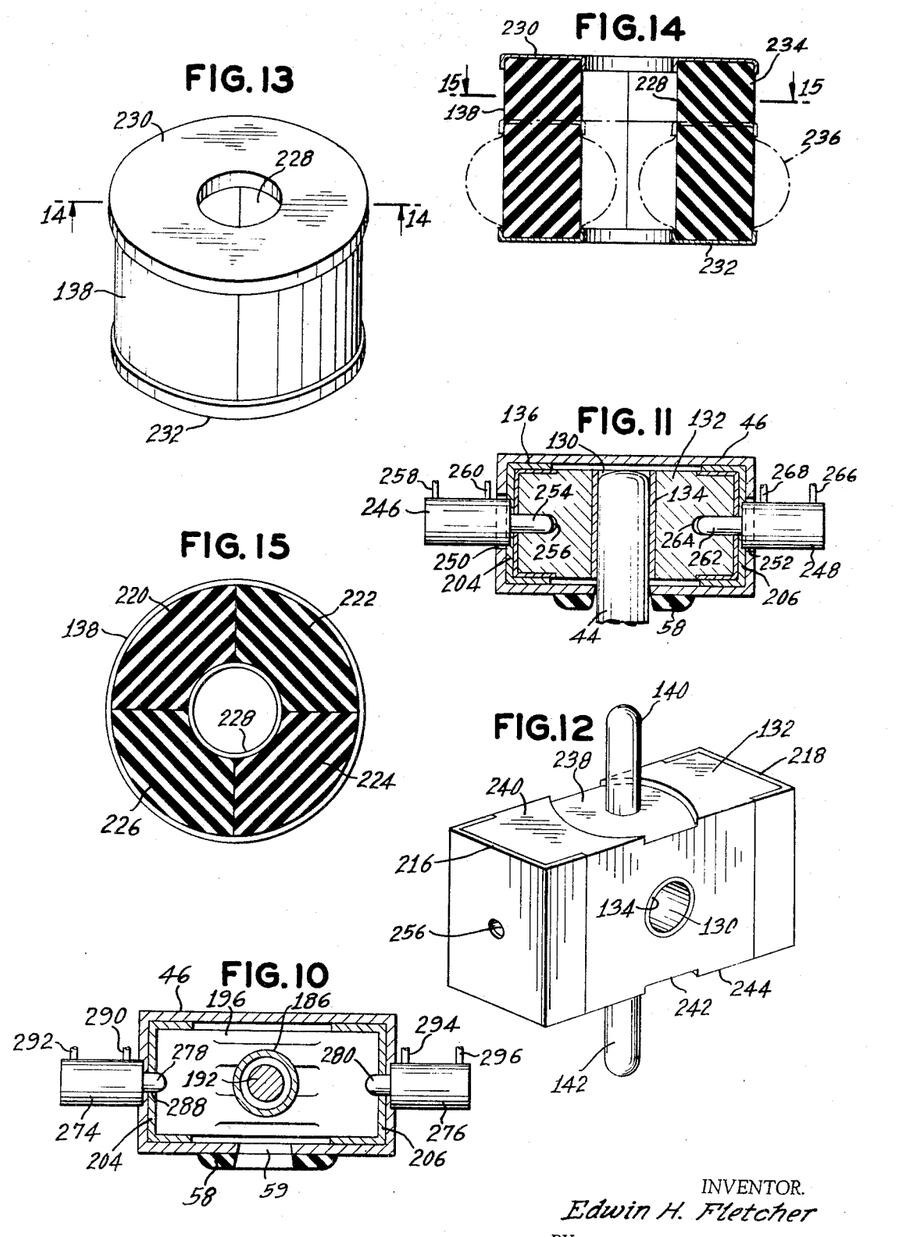
FIG. 10 is a cross-sectional view along line 10—10 of FIG. 5.
FIG. 11 is a cross-sectional view along line 11—11 of FIG. 5.
FIG. 12 is an enlarged perspective view of one of the trunnions or blocks which receives one of the pin connectors.
FIG. 13 is an enlarged front perspective view of an energy absorber or dampening device used in combination with the trunnion of FIG. 12.
FIG. 14 is a cross-sectional view along line 14—14 of FIG. 13.
FIG. 15 is a cross-sectional view along line 15—15 of FIG. 14.

With particular reference to FIGS. 13, 14 and 15 now, energy absorption cell 138 used in combination with the sliding trunnion 132 of this invention is composed of four heavy rubber quarter units 220, 222, 224 and 226 which are maintained in a circular shape having a hollow center 228 by means of an upper and lower metal cap-like plate 230 and 232 respectively. Rubber energy absorption cell 138 is deformable or compressible in a vertical direction from its solid line relaxed condition 234 of FIG. 15 into a stressed condition 236 as represented by the dashed lines of FIG. 15. In moving from the relaxed condition 234 to the stressed condition 236, the energy absorption unit 138 will to a greater extent absorb or dampen the movement of the trunnion 132 located either above or below energy cell 138. If the cells 138 have been prestressed, deformed or compressed, a greater or more forceful movement of sliding trunnion 132 will be required to further compress or deform energy units 138; a prestressing of energy cells 138 thereby in effect further dampens and restrains the vertical movement of sliding trunnion 132. Energy absorption unit 138 may be used either singly, dually, or treble units may be used above and below the receiving block 132, depending on the design requirements of the particular articulated barge-tug combination. While the energy absorption cells 138 shown in the embodiment of the invention depicted herein are of a hard rubber, other like energy absorption devices or yieldable means could be used, such as large compression springs or hydraulic energy absorption units. Additionally rubber energy absorption units 138 shown in detail in FIGS. 13 through 15 need not necessarily be round or circular in shape but may instead assume other shapes.

Connecting pin receiving block or trunnion 132 is provided with an appropriate depression or opening 238 on its upper surface 240 to accommodate the lower disc like plate 232 of energy absorption unit 138, such that between the combination of guide 140 and formed depression 238 the energy absorption unit is properly positioned and retained on the upper surface of sliding trunnion 132. A similar depression 242 is formed in the lower surface 244 of the block 132 for like purposes.

At times, when it is desired that there be no relative vertical movement between the articulated tug-barge of this invention, the sliding trunnion or pin receiving block 132 may be locked within the slide or cage 136 such as to prevent vertical movement therebetween. Such occasions may arise when the barge and tug are traversing over relatively smooth or calm waters, as might be encountered in lakes, rivers, waterways and harbors. To prevent the sliding trunnion 132 from oscillating or moving vertically within the slide or cage 136 hydraulic locking mechanisms 246 and 248 are provided, as more clearly depicted in FIGS. 5 and 11, respectively attached and mounted to sides 204 and 206 of the cage or slide 136. Locking mechanisms 246 and 248 are moveable with the slide 136 and respectively extend through openings 250 and 252 within the sides of housing 46, which are provided to permit these locking mechanisms to move vertically upward or downward with the slide 136 when it is moved. Locking mechanism 246 includes a locking pin 254 which is extendable outward from the mechanism into an appropriate opening 256 provided in one end of the receiving block 132 to lock the same with respect to the slide 136, and this pin 254 is completely retractable into the mechanism 246 such as to unlock the sliding trunnion 132 from the slide 136. Hydraulic locking mechanism 246 is operated through hydraulic lines 258 and 260. Similarly hydraulic locking mechanism 248 includes a locking pin 262 which is extendable from the mechanism into locking opening 264 within the opposition end of trunnion 132 to lock the same with respect to slide 136, and is completely retractable within the mechanism 248 to release the trunnion from its locked position. Hydraulic lines 266 and 268 are provided to operate the locking mechanism 248. Thus it is seen that the articulated pin connected arrangement can be either a static system with the trunnion locked in position or a dynamic energy system by using the energy absorption cells.

Figure 16:
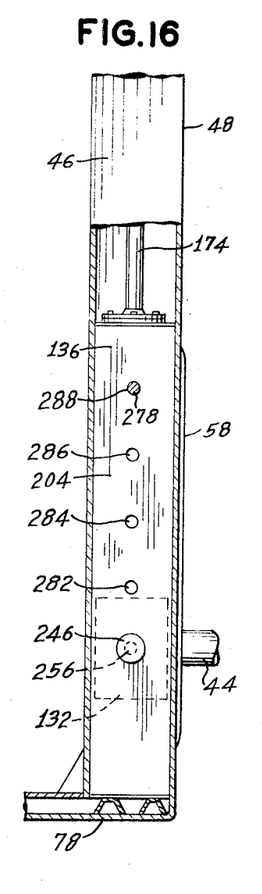
FIG. 16 is a reduced transverse sectional view along line 16—16 of FIG. 5, portions thereof being broken away.
Figure 17:
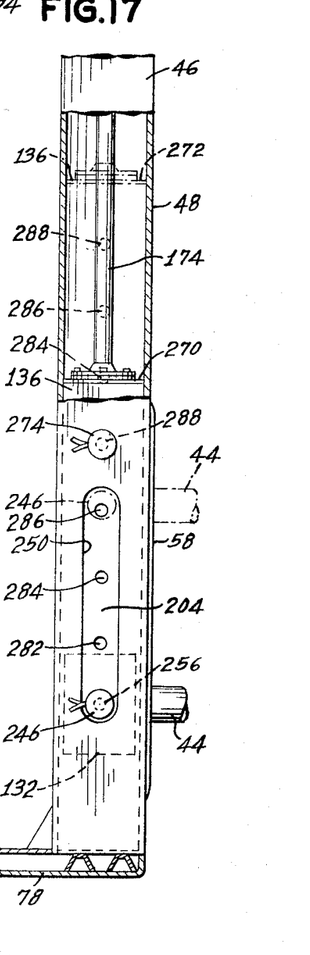
FIG. 17 is a reduced transverse sectional view along line 17—17 of FIG. 5, portions thereof being broken away.

As hereinabove explained, slide or cage 136 is vertically adjustable in an upward and downward direction in the housing 46 to accommodate for extreme changes in draft of the barge which would be experienced during the loading and unloading of the barge with a metal ore. With reference now to FIGS. 5, 16 and 17, the slide 136 is moveable and adjustable within the housing 46 from a lowermost position represented by reference numeral 270 to an uppermost position as at 272 of FIG. 17. The cage 136 being adjustable and moveable through hydraulic adjusting mechanism 164 and its included piston rod 174 attached to the cage top.

In the embodiment of the invention depicted in FIGS. 5, 16 and 17, the slide 136 moves vertically within the housing 46 on a metal to metal contact between the side walls thereof which are maintained in a lubricated condition by an appropriate grease. Although it is also contemplated in this invention that the cage 136 could move vertically within the housing on bearings mounted within the side walls of the housing 46.

Once the barge 18 has been loaded or unloaded, slide or cage 136 is appropriately adjusted for the given draft of the barge under its loaded conditions by the hydraulic adjusting mechanism 164, and then slide 136 is locked in the appropriate, so adjusted, condition by means of hydraulic locking mechanisms 274 and 276, see FIG. 10, built into the sides of housing 46. Each of the locking mechanisms 274 and 276 has a locking pin 278 and 280 respectively which can be completely retracted within the locking mechanism to release the slide or cage 136 and can be extended outward from the locking mechanism to extend through appropriate openings, such as at 282, 284, 286 and 288 (see FIGS. 16 and 17) to lock the moveable slide or cage 136 with respect to housing 46. The movement of locking pin 278 within locking mechanism 274 is controlled by hydraulic lines 290 and 292 and the reciprocal motion of pin 280 within the mechanism 276 is controlled by hydraulic lines 294 and 296. While only a series of four holes, 282, 284, 286 and 288 are provided to adjustably and selectively lock the slide 136 at various positions with respect to the housing 46, more or less could be provided as required by the given particular articulated barge-tug arrangement.

Figure 18:
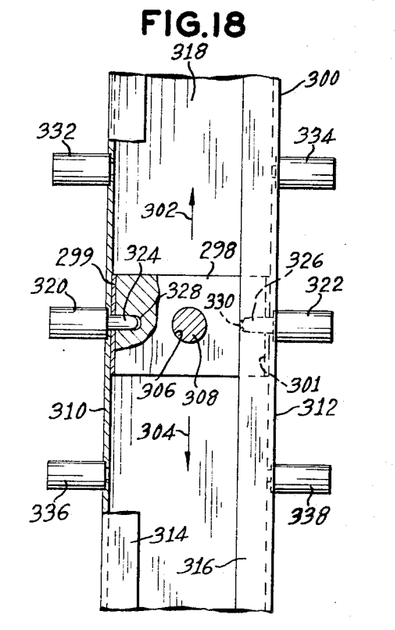
FIG. 18 is a cross-sectional elevational view showing another embodiment of the pin connection between the tug and barge, portions thereof being broken away.

With particular reference to FIG. 18 now, another arrangement or embodiment of the invention is shown therein in a view similar to that as depicted in FIG. 5. Herein a sliding trunnion or pin receiving block 298 having replaceable wear plates 299 and 301 is shown moveable within a housing 300 in a vertically upward direction 302 and vertically downward direction 304. The block or trunnion 298 is provided with an opening 306 to accommodate and receive a connector pin 308 from the tug. Block 298 is moveable between the side walls 310 and 312, partial front wall portions 314 and 316, and back wall 318 of the housing 300. In this arrangement it is intended and contemplated that the block or trunnion 298 will be fixed and will remain fixed with respect to housing 300 except for initial adjustment to accommodate the draft of the barge to that of the tug. Once the initial adjustment in the vertical direction 302 and 304 is made, trunnion 298 is locked in place within the housing 300. The adjustment or vertical movement of trunnion 298 within the housing 300 can be accomplished by such devices as a hydraulic mechanism, a screw jack device, or a winch and cable arrangement. Once adjusted, the trunnion 298 is locked by hydraulic locking mechanisms such as at 320 and 322 which include respective locking pins 324 and 326 engageable in appropriate openings 328 and 330 within the ends of the receiving block or trunnion 298. Additional hydraulic locking mechanisms are provided such as at 332 and 334 and also at 336 and 338 to likewise lock sliding trunnion 298 in its adjusted position, should such position be opposite or in the vicinity of these additional locking mechanisms 332 through 338. Additional similar locking mechanism could be provided if needed or if so desired, spaced along the sides 310 and 312 of housing 300, should the particular design and arrangement of any given articulated barge-tug combination warrant the same. The fixed trunnion or block arrangement as depicted in FIG. 18 is particularly adapted to an articulated barge-tug arrangement which is intended to traverse water which will be subject to slight or very limited wave action, such an encountered in rivers, lakes, harbors and some bays.

Figure 19:
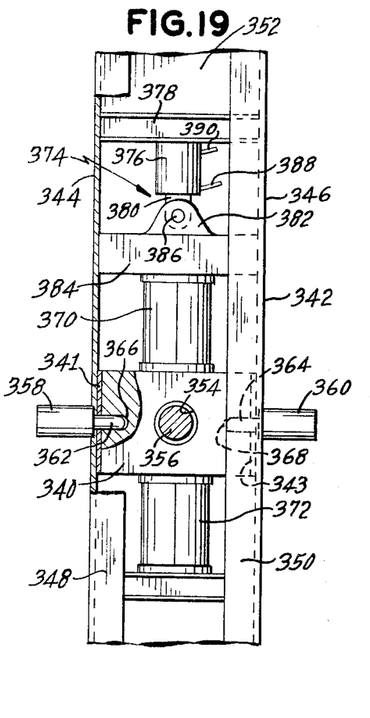
FIG. 19 is a cross-sectional elevational view of a further embodiment of the pin connection between the tug and barge, portions thereof being broken away.

A further embodiment or arrangement of the invention is shown and depicted in FIG. 19. With reference to this figure now, the trunnion or connecting pin receiving block 340 including replaceable wear plates 341 and 343 is moveable within a housing 342. Housing 342 includes side walls 344 and 346, partial front wall sections 348 and 350 and a back wall 352. Trunnion 340 is provided with a circular opening 354 to properly receive and accommodate a connecting pin 356 from the barge. The trunnion 340 is lockable with respect to the housing 342 by means of hydraulic locking mechanisms 358 and 360 mounted respectively on side walls 344 and 346 of housing 342. Each of the locking mechanisms 358 and 360 is respectively provided with a locking pin 362 and 364 which can be extended from their respective cylinders into appropriate respective openings 366 and 368 within the ends of sliding trunnion 340, thereby locking the same within and with respect to the housing 342. Locking pins 362 and 364 are retractable within their respective locking mechanism 358 and 360 to release the sliding trunnion 340 with respect to the housing 342 such that the same may oscillate vertically, moving upward and downward within the housing 342. The oscillatory motion of trunnion 340 caused by the relative movement between the tug and the barge is dampened or confined by rubber energy absorption cells 370 and 372, one of which is located above and the other of which is located below trunnion 340. Rubber energy absorption cells 370 and 372 are similar to energy absorption cell 138 depicted in FIGS. 13 through 15 and described hereinabove. While only one energy absorption cell is used above and below trunnion 340 within the arrangement of FIG. 19 more could be employed if so desired. The oscillatory movement of sliding trunnion 340 within housing 342 can be further restrained or dampened by prestressing energy absorption cells 370 and 372, using hydraulic prestressing mechanism 374 mounted in the upper portion of housing 342 and in contact with the top of energy absorption cell 370. Hydraulic prestressing mechanism 374 includes a hydraulic cylinder 376 mounted to a cross member or H-channel 378 within the top portion of housing 342. Within the cylinder 376 is a hydraulic piston connected to piston rod 380, which is connected to a yoke arrangement 382 on the top of a prestressing block 384 by means of a connecting pin 386. Prestressing block 384 is moved upward and downward within housing 342 by operating hydraulic mechanism 374 through its hydraulic lines 388 and 390. When the energy absorption cells 370 and 372 are prestressed by the hydraulic prestressing mechanism 374, they will become somewhat deformed as depicted in the dashed configuration 236 of FIG. 14. Energy absorption cells 370 and 372 could be other than rubber units as hereinbefore stated; other types of energy absorption units which could be employed include coil spring units, and hydraulic mechanisms. Other prestressing devices which might be substituted for the hydraulic prestressing device 374 might include a screw jack arrangement as previously stated.

The configuration and arrangement as depicted in FIG. 19, that is, with the trunnion 340 being either fixed or free to oscillate between energy absorption units, would be usable and employable in all articulated barge-tug arrangements, with the one exception being where there are extreme changes in the draft of the barge due to extra heavy loading of the same, wherein an arrangement similar to that as depicted in FIG. 5 would need to be employed. The FIG. 19 arrangement is particularly adaptable to an operation in which the articulated barge tug arrangement is meant to traverse water bodies subject to moderate or heavy wave action as encountered in sounds, bays and particularly in open seas, although this arrangement is likewise readily adaptable for use in an articulated barge-tug combination which will traverse water bodies such as rivers, lakes, inland waterways and harbors.

Figure 21:
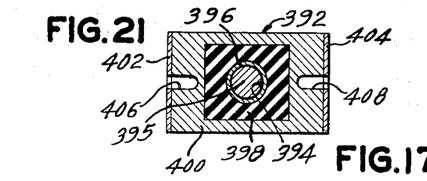
FIG. 21 is a cross-sectional elevational view showing another embodiment of a trunnion or block useable in the arrangement of FIG. 18.

With particular reference to FIG. 21 now, there is depicted therein, in cross-sectional elevational view, another embodiment of a trunnion or receiving block 392 having replaceable wear plates 402 and 404 which is useable in the arrangement of FIG. 18. The block 392 which can be slideably adjustable in a vertical direction in housing 300, is made to receive pin 395 from a tug in its central opening 394, and may be selectively lockable in any one of a plurality of positions within channel 300 by employing pins similar to those at 324 and 326 to engage in openings or passageways 406 and 408. Central pin receiving opening 394 within block 392 is surrounded with a metal sleeve 396. The peripheral shell or outer portion 400 of block 392 is fabricated of metal, and the inner core or intermediate space 398 between shell 400 and sleeve 396 is fabricated of hard rubber such that sleeve 396 may move in any direction within block 392. Thus, when block 392 is used or employed in the articulated barge-tug connection of this invention with connecting pin 395 of the tug engaged within opening 394, there is permitted a certain, limited amount of controlled universal articulated motion between the barge and tug. This type of articulated connection would permit motion and energy absorption between the barge and tug not only in the vertical and horizontal directions but also on any angle. In other words, with this type of connection there would be a certain, but limited amount of listing and yawing between the barge and tug.

When employing the articulated pin-connected arrangement of this invention, there has been found to be an actual gain in propulsive efficiency and an increase in speed for the articulated ship over that obtainable when the tug unit of the ship tows the barge unit of the ship behind the tub by the usual hawser. In actual model tests in a model basin the articulated ship showed increases in speed over the barge being towed by the tug of up to 25% with minimum increases of over 10%. Additionally, when using the articulated system as compared to the tug pulling the barge there is a substantial reduction in the motion of the tug thereby greatly increasing the safety of the tug and its crew. The reduced tug motion also permits complete propeller submersion under all conditions of operation of the articulated ship thereby increasing the propulsive efficiency of the same.

Other advantages of the pin-connected articulated system over the tug-pulled hawser connected barge arrangement include: insurance rates which are much lower and nearly equivalent to the insurance rates applicable to steamers; a ready source of electric power for the barge which is readily suppliable from the tug by means of a simple connection; a ready means of access to the barge from the tug for inspection at sea of barge, barge gear and cargo; ready use of the tug pumps, hoses and hose connections to the barge in case of fire, damage to the barge or other emergencies arising on the barge; and the ready establishment of maximum safety measures on the barge.

Furthermore, there are additional cost advantages and considerations for the pin-connected articulated system of this invention over other ocean-going cargo carrying arrangements. With the articulated system there is no need for the usual and expensive sea towing gear required in a tug-towed-barge combination such as extra generators, double drum towing winches, constant tension devices, hawsers, and the like. Due to its simplified construction, the articulated system only costs a fraction of the cost of a deep sea steamer of comparable total cubic carrying capacity.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. The combination comprising an independent powerless cargo carrying watercraft, an independent powered watercraft for pushing the cargo carrying watercraft, said cargo carrying watercraft comprising means defining an opened bottom well in its stern portion, the bow portion of said powered watercraft having a normal ship-shaped bow terminating in a stem and disposable in said well with said bow portion being adjacent to and spaced from said well-defining means, and selectively operable pivotal connecting means establishing a horizontal laterally extending pivot axis connecting between said stern portion and said bow portion for pivotally connecting said powered watercraft to said cargo carrying watercraft, said means providing a positive force transmitting connection between said cargo carrying watercraft and said powered watercraft operable during both forward and reverse movement of said powered watercraft, said selectively operable means permitting free pivotal motion about said axis between said cargo carrying watercraft and said powered watercraft and being selectively operable to disconnect said powered watercraft from said cargo carrying watercraft.

2. The combination as defined in claim 1 wherein said selectively operable means includes a pair of connecting pins respectively disposed on the port and starboard sides of said bow portion of said powered watercraft, said pins being extendable laterally outward of said bow portion and retractable inward of said bow portion, said well within said stern portion of the cargo carrying watercraft having a pair of opposed side walls, said side walls having a respective pin receiving means disposed therein in general horizontal alignment with each other, each said connecting pin nesting in respective said pin receiving means when said pins are extended laterally outward from said bow portion of said powered watercraft, said pins and said receiving means when nested providing a generally horizontal pivot axis for restricted relative rotational motion thereabout between said powered watercraft and said cargo carrying watercraft in a generally vertical plane.

3. The combination as defined in claim 2 further comprising yieldable means operatively associated with said pin receiving means to permit limited movement of said pin receiving means generally in the plane of its respective said side wall.

4. The combination as defined in claim 3 wherein said pin receiving means includes a block having a rubber member disposed therein and a passageway extending within said rubber member to receive respective extended pin.

5. The combination comprising an independent powerless cargo carrying watercraft, an independent powered watercraft for pushing the cargo carrying watercraft, said cargo carrying watercraft having a well in its stern portion, the bow portion of said powered watercraft being disposed in said well of said stern portion of said cargo carrying watercraft, and selectively operable means disposed between said well and said bow portion for connecting said powered watercraft to said cargo carrying watercraft, said means providing positive connection between said cargo carrying watercraft and said powered watercraft during forward and reverse movement of said powered watercraft, said selectively operable means including a pair of connecting pins respectively disposed on the port and starboard sides of said bow portion of said powered watercraft, said pins being extendable laterally outward of said bow portion and retractable inward of said bow portion, said well within said stern portion of said cargo carrying watercraft having a pair of opposed side walls, said side walls having a respective pin receiving means disposed therein in general horizontal alignment with each other, each said connecting pin nesting in respective said pin receiving means when said pins are extended laterally outward from said bow portion of said powered watercraft, each said respective pin receiving means including a movable block having a passageway therein for receiving said respective pin when extended, a generally vertical channel member mounted to each said side wall, said movable block being disposed slidably and adjustably within said channel member, said block being adapted and arranged to oscillate generally vertically within said channel member, and a pair of spaced yieldable means positioned in operative relation above and below said block to restrain the oscillatory generally vertical movement thereof between said yieldable means.

6. The combination as defined in claim 3 further comprising adjustable means for varying the restraint of said yieldable means on said pin receiving means.

7. The combination as defined in claim 5 wherein each said yieldable means includes a rubber energy absorption cell.

8. The combination as defined in claim 5 further comprising selectively operable locking means associated with said movable block to selectively lock said block in a single fixed position within vertical channel member, said locking means including a fluid mechanism attached to a side wall of said channel member and having a cylinder and piston, said block having a wall portion adjacent said channel member side wall, said wall portion including an opening therein for receiving said piston when extended from said fluid mechanism, said piston being extendable outwardly from said cylinder through said channel member side wall and into said opening to lock said block and being retractable inwardly of said cylinder to release the same from its locked position.

9. The combination as defined in claim 5 further comprising adjustable means for controlling the amount of restraint imposed by said yieldable means, said adjustable means including a fluid mechanism mounted to said channel member and in contact with one of said pair of yieldable means, said fluid mechanism including a cylinder and piston, said piston being extendable outwardly and inwardly of said cylinder to respectively compress and decompress said yieldable means a predetermined amount thereby adjusting the restraint imposed by said yieldable means upon said oscillatory movement.

10. The combination comprising an independent powerless cargo carrying watercraft, an independent powered watercraft for pushing the cargo carrying watercraft, said cargo carrying watercraft having a well in its stern portion, the bow portion of said powered watercraft being disposed in said well of said stern portion of said cargo carrying watercraft, and selectively operable means disposed between said well and said bow portion for connecting said powered watercraft to said cargo carrying watercraft, said means providing positive connection between said cargo carrying watercraft and said powered watercraft during forward and reverse movement of said powered watercraft, said selectively operable means including a pair of connecting pins respectively disposed on the port and starboard sides of said bow portion of said powered watercraft, said pins being extendable laterally outward of said bow portion and retractable inward of said bow portion, said well within said stern portion of said cargo carrying watercraft having a pair of opposed side walls, said side walls having a respective pin receiving means disposed therein in general horizontal alignment with each other, each said connecting pin nesting in respective said pin receiving means when said pins are extended laterally outward from said bow portion of said powered watercraft, each said respective pin receiving means including a movable block having a passageway therein for receiving said respective pin when extended, a generally vertical inner housing, a generally vertical outer channel member mounted to respective said side wall, said inner housing being slidably mounted and adjustable within said outer channel member, said movable block being disposed slidably and adjustably within said inner housing, adjustable means connected to said inner housing for vertically adjusting and positioning said inner housing with respect to said outer channel member, lockable means for selectively locking said inner housing with respect to said outer channel member in any one of a plurality of vertical positions, said block being adapted and arranged to oscillate generally vertically within said inner housing, and a pair of spaced yieldable means positioned in operative relation above and below said block to restrain the oscillatory generally vertical movement thereof between said yieldable means.

11. The combination as defined in claim 10 wherein said adjustable means for vertically adjusting said inner housing includes a first fluid mechanism having a piston and cylinder mounted between said outer channel member and said inner housing, said piston of said first fluid mechanism being extendable inwardly and outwardly of said cylinder of said first fluid mechanism to move said inner housing generally vertically within said outer channel member, and wherein said lockable means for locking said inner housing includes a second fluid mechanism having a cylinder mounted on a side wall of said outer channel member and a piston, said inner housing having a wall portion adjacent said outer channel side wall, said wall portion including a plurality of spaced vertical openings therein for receiving said piston when extended from said second fluid mechanism, said piston of said second fluid mechanism being extendable outwardly from said cylinder of said second fluid mechanism through said side wall of said outer channel member and into engagement within any one of said plurality of openings within said wall portion of said inner housing to thereby lock said inner housing in any one of a series of vertical positions within said outer channel member, and said piston of said second fluid mechanism being retractable into said cylinder thereby releasing said inner housing from its locking position within said outer channel member.

12. The combination as defined in claim 10 further comprising adjustable means for varying the restraint of said yieldable means on said block within said inner housing.

13. The combination as defined in claim 10 wherein each said yieldable means includes a rubber energy absorption cell.

14. The combination as defined in claim 12 wherein said adjustable means includes a fluid mechanism mounted to said inner housing and in contact with one of said pair of yieldable means, said fluid mechanism including a cylinder and piston, said piston being extendable outwardly and inwardly of said cylinder to respectively compress and decompress said yieldable means a predetermined amount thereby adjusting the restraint imposed by said yieldable means upon said oscillatory movement.

15. The combination as defined in claim 10 further comprising selectively operable locking means associated with said movable block to selectively lock said block in a single fixed position within said inner housing, said locking means including a fluid mechanism attached to a side wall of said inner housing and having a cylinder and piston, said block having a wall portion adjacent said inner housing side wall, said wall portion including an opening therein for receiving said piston when extended from said cylinder, said piston being extendable outwardly from said cylinder through said inner housing side wall and into said opening to lock said block within said inner housing, and said piston being retractable inwardly of said cylinder thereby releasing said movable block from its locked position.

16. The combination as defined in claim 2 wherein said connecting pins are disposed generally perpendicular to the longitudinal axis of said powered watercraft, and wherein each said respective pin receiving means is disposed generally perpendicular to its respective said side wall.

17. A coupling combination between a first vessel and a second vessel comprising: a first vessel having a recess for receiving the end of a second vessel, said recess being sufficiently large to provide a clearance around the end of the second vessel therein received; side walls in said recess having opposed vertical slots extending into said side walls perpendicularly to the centerline of said second vessel; and locking members on said second vessel for extending into and selectively engaging said slots when said end of said second vessel is within said recess.

18. A coupling combination between a first vessel and a second vessel comprising: a first vessel having a recess for receiving the end of a second vessel, said recess being sufficiently large to provide a clearance around the bow end of said second vessel therein received; said bow end of said second vessel being a normal ship-shaped bow terminating in a stem which is disposed in said recess; side walls in said recess having opposed openings extending into said side walls perpendicularly to the centerline of said second vessel; and locking members on said second vessel for extending into and selectively engaging said openings when said end of said second vessel is within said recess, said locking members permitting free pivotal motion between said first and second vessels about an axis extending through said locking members.

19. A coupling combination between a first vessel and a second vessel comprising a first vessel having a predetermined beam width and a recess adjacent its stern for receiving the bow end of a second vessel, said recess being sufficiently large to provide a clearance around said bow end of said second vessel therein received, said recess having a pair of opposed side walls, said second vessel having a beam width less than said predetermined beam width whereby said second vessel is spaced inwardly of each of the sides of said first vessel adjacent its said stern, said bow end of said second vessel having a pair of opposed side walls, opposed openings on respective said side walls of one of said vessels, locking members movable outwardly of respective said side walls of the other of said vessels, said locking members being extendable into and selectively engageable with said openings when said one end of said second vessel is disposed in said recess, said locking members permitting free pivotal motion between said first and second vessels about an axis extending through said locking members.

20. A coupling combination between a first vessel and a second vessel comprising:
a first vessel having a recess for receiving the end of a second vessel, said recess being sufficiently large to provide a clearance around the end of the second vessel therein received;
side walls in said recess having opposed vertical slots extending into said side walls perpendicularly to the centerline of said second vessel;
locking members on said second vessel for extending into said slots; and
said slots including means therein engaging said members for transmitting longitudinal propulsive forces between said vessels when said end of said second vessel is within said recess.

21. The coupling combination of claim 17 wherein said locking members are pins extendable from and retractable to each side of said second vessel along a common centerline perpendicular to the centerline of said second vessel.

22. The coupling combination of claim 21 wherein said pins are extended and retracted hydraulically.

23. The coupling combination of claim 17 wherein said recess is located amid the stern of said first vessel.

24. The coupling combination of claim 17 wherein said recess is sufficiently large to permit freedom of movement between said first vessel and said second vessel in pitching, heaving, and rolling motions while said vessels remain engaged.

25. The coupling combination of claim 17 wherein said slots are of sufficient width and depth to provide a clearance between said locking members and the walls of said slots when said locking members are in a fully extended position and are engaged in said slots.

26. A coupling combination for a tugboat and barge comprising:
a barge having a recess in the stern thereof for receiving the forebody of a tugboat, said recess being sufficiently large to permit relative movement between said barge and said tugboat in pitching, heaving, and rolling motions;
side walls in said recess having opposed vertical slots extending into said side walls perpendicularly to the centerline of said tugboat; and
locking members on the sides of the forebody of said tugboat for extending into and selectively engaging said slots when said forebody of said tugboat is within said recess.

27. The tugboat and barge combination of claim 26 wherein said locking members are pins extendable from and retractable to the hull of said tugboat on each side of the forebody thereof along a common centerline perpendicular to the centerline of said tugboat.

28. The tugboat-barge combination of claim 26 wherein said side walls in said recess are substantially parallel to each other and to the centerline of said tugboat at and adjacent said slots.

29. The tugboat and barge combination of claim 26 wherein said locking members are extended and retracted hydraulically.

30. A coupling combination for a tugboat and barge for permitting said tugboat to propel and steer said barge comprising:
a barge having a recess amid the stern thereof for receiving the floating forebody of a tugboat;
side walls in said recess having opposed vertical slots which extend into said side walls perpendicularly to the centerline of said tugboat;
locking members on each side of the forebody of said tugboat which locking members can be extended along a line perpendicular to the centerline of said tugboat to engage said vertical slots; and
said recess in said barge being wider than the greatest abeam measurement on the forebody of said tugboat and being sufficiently deep to provide a clearance between the bow of said tugboat and the forward wall of the recess when the forebody of said tugboat is received in said recess and said locking members are engaging said vertical slots, to permit freedom of movement between said tugboat and said barge in pitching, heaving, and rolling motions.

31. A coupling combination between a first vessel and a second vessel comprising a first vessel having a recess for receiving the end of a second vessel, said recess being sufficiently large to provide a clearance around the end of the second vessel therein received and being bounded by side walls, said side walls having wall portions forming opposed vertical slots extending inwardly into the first vessel, said slot wall portions extending perpendicularly to the centerline of said second vessel, and locking members on said second vessel for extending into and selectively operably cooperating with said slot wall portions for transmitting longitudinal propulsive forces between said vessels when said end of said second vessel is within said recess.

32. A coupling combination between a first vessel and a second vessel comprising a first vessel having a recess for receiving one end of a second vessel, said recess being sufficiently large to provide a clearance around said one end of said second vessel therein received and being bounded by a pair of side walls, said one end of said second vessel having a pair of side walls, one said pair of side walls on one of said vessels having respective opposed vertical slot openings extending thereinto, a pair of vertical spaced walls extending perpendicularly to the centerline of said vessels and inwardly of each said slot openings, and means on the other of said vessels movable outwardly of respective said side walls of said other vessel and extending through each of said slot openings, said means operably cooperating with said vertical walls for transmitting longitudinal propulsive forces between said vessels when said one end of said second vessel is disposed in said recess.

33. The coupling combination of claim 17 further comprising means within said slots for operably maintaining said locking members within said slots when said end of said second vessel is within said recess and said locking members extend into said slots.

34. The combination comprising an independent powerless cargo carrying watercraft, an independent powered watercraft for pushing the cargo carrying watercraft, said cargo carrying watercraft having a well in its stern portion, the bow portion of said powered watercraft being disposed in said well of said stern portion of said cargo carrying watercraft, and selectively operable means disposed between said well and said bow portion for connecting said powered watercraft to said cargo carrying watercraft, said means providing positive connection between said cargo carrying watercraft and said powered watercraft during forward and reverse movement of said powered watercraft, said selectively operable means including a pair of connecting pins respectively disposed on the port and starboard sides of said bow portion of said powered watercraft, said pins being extendable laterally outward of said bow portion and retractable inward of said bow portion, said well within said stern portion of said cargo carrying watercraft having a pair of opposed side walls, said side walls having a respective pin receiving means disposed therein in general horizontal alignment with each other, each said connecting pin nesting in respective said pin receiving means when said pins are extended laterally outward from said bow portion of said powered watercraft, said pin receiving means including a hard rubber core having a passageway therein and a metal casing surrounding said core, said casing being connected to said side wall, a thin metal sleeve circumferentially surrounding said passageway providing a bearing surface for said extended pin, said rubber core being yieldable to permit a limited universal motion between said powerless cargo carrying watercraft and said powered watercraft.

35. The combination comprising an independent powerless cargo carrying watercraft, an independent powered watercraft for pushing the cargo carrying watercraft, said cargo carrying watercraft having a well in its stern portion, the bow portion of said powered watercraft being disposed in said well of said stern portion of said cargo carrying watercraft, and selectively operable means disposed between said well and said bow portion for connecting said powered watercraft to said cargo carrying watercraft, said means providing positive connection between said cargo carrying watercraft and said powered watercraft during forward and reverse movement of said powered watercraft, said selectively operable means including a pair of connecting pins respectively disposed on the port and starboard sides of said bow portion of said powered watercraft, said pins being extendable laterally outward of said bow portion and retractable inward of said bow portion, said well within said stern portion of said cargo carrying watercraft having a pair of opposed side walls, said side walls having a respective pin receiving means disposed therein in general horizontal alignment with each other, each said connecting pin nesting in respective said pin receiving means when said pins are extended laterally outward from said bow portion of said powered watercraft, each said respective pin receiving means including a movable block having a passageway therein for receiving said respective pin when extended, a generally vertical channel member mounted to each said side wall, said movable block being disposed slidably and adjustably within said channel member, and means for selectively locking said block in a predetermined position within said channel member.

36. The combination as defined in claim 5 further comprising yieldable means operatively associated with said movable block to permit limited movement of said pin while said block is locked in its said predetermined position.

References Cited

UNITED STATES PATENTS

| | | |
|---|---|---|
| 1,891,496 | 12/1932 | Bedford. |
| 3,345,970 | 10/1967 | DeLong _______ 114—235 |
| 20,944 | 7/1858 | Gibson _______ 114—235.1 |
| 2,375,139 | 5/1945 | Schmitt et al. ___ 114—235.1 X |
| 3,035,536 | 5/1962 | Archer. |

TRYGVE M. BLIX, Primary Examiner

U.S. Cl. X.R.

114—77

REEXAMINATION CERTIFICATE (137th)
United States Patent [19]

Fletcher

[11] B1 3,512,495

[45] Certificate Issued  Nov. 22, 1983

[54] SELECTIVELY CONNECTABLE BOAT AND BARGE

[75] Inventor: Edwin H. Fletcher, Jacksonville, Fla.

[73] Assignee: United States Freight Company, New York, N.Y.

Reexamination Requests:
No. 90/000,082, Oct. 9, 1981
No. 90/000,287, Nov. 12, 1982

Reexamination Certificate for:
Patent No.: 3,512,495
Issued: May 19, 1970
Appl. No.: 588,162
Filed: Oct. 20, 1966

[51] Int. Cl.$^3$ .................. B63B 3/02; B63B 21/00
[52] U.S. Cl. .................. 114/248; 114/77 R; 114/249
[58] Field of Search .................. 114/248, 249, 77 R

[56] References Cited

U.S. PATENT DOCUMENTS

| | | | |
|---|---|---|---|
| 20,944 | 7/1858 | Gibson | 114/248 |
| 1,891,496 | 12/1932 | Bedford | 16/86 A |
| 2,375,139 | 5/1945 | Schmitt et al. | 114/248 |
| 3,035,536 | 5/1962 | Archer | 114/249 X |
| 3,345,970 | 10/1967 | De Long | 114/248 |

FOREIGN PATENT DOCUMENTS

1906905  10/1964  Fed. Rep. of Germany .

OTHER PUBLICATIONS

Patent Application Announcement No. 1964-23871, Japanese Patent Office, Oct. 26, 1964, Inventor: Ishiwara "*Marine Hydrodynamics*", J. N. Newman, MIT Press, p. 286.

"Different Iron Ore Shipping Method Working Well on Great Lakes", Marine Engineering/Log Magazine, Aug. 1963, p. 74.

"Life Begins Again at 43", Marine Engineering/Log Magazine, Feb. 1963, P. 65.

"Worlds Largest Barge Delivered", Marine Engineering/Log Magazine, Sep. 1962, p. 70.

"New Chapter in Coastal Towing", Towline Magazine, vol. XV, No. 4, Dec. 1962, pp. 1–4.

"Articouple, Automatic Articulate Coupler for Pusher-Barge System", Taisei Engineering Consultants, Inc., Aug. 1982.

*Primary Examiner*—Sherman D. Basinger

[57] ABSTRACT

The combination of an independent powerless cargo carrying watercraft and an independent powered watercraft for pushing the cargo carrying watercraft with the cargo carrying watercraft having a well in its stern portion and the bow portion of the powered watercraft being disposed within the well. Additionally, the combination includes selectively operable [means] *connectors* disposed between the well and the bow portion for connecting the powered watercraft to the cargo carrying watercraft to provide a positive force transmitting connection therebetween during both forward and reverse movement of the powered watercraft. The [means] *connectors* connecting the powered watercraft to the cargo carrying watercraft may include yieldable [means] *members* to permit some, but limited, universal movement between the powered watercraft and the cargo carrying watercraft.

REEXAMINATION CERTIFICATE ISSUED UNDER 35 U.S.C. 307.

SELECTIVELY CONNECTABLE BOAT AND BARGE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 37-57:

In many countries, including the Unites States, river barges operating in comparatively smooth water are pushed by tug boat instead of being pulled by tug boats. In fact a tremendous volume of goods is moved in this manner. While pushing operations have sometimes been attempted in bays and sounds and other bodies of moderately rough water these pushing [operatoins] *operations* have not been successful and to an even greater extent, open ocean operations have not been successful. When operating in waves and rough water, the tug boat and the barge tend to move relative to each other. If the tug boat and barge are tied together so as to prevent this relative movement, large strains are placed on the gear and equipment. Due to these strains, the tying together of the tug and the barge has generally been unsuccessful. Further, prior to this invention, satisfactory linkages have heretofore not been available which would permit the necessary degree of relative movement while at the same time imposing a degree of restraint necessary to permit the tug to propel and control the barge while in a pushing relationship with the barge.

AS A RESULT OF REEXAMINATION, IT HAS BEEN DETERMINED THAT:

The patentability of claims 5, 7-15, 35, and 36 is confirmed.

Claims 3 and 6, having been finally determined to be unpatentable, are cancelled.

Claims 1, 4, 17-20, 25, 26, and 30-34 are determined to be patentable as amended:

Claims 2, 16, 21-24, and 27-29, dependent on amended claims, are determined to be patentable.

New claim 37 is added and determined to be patentable.

1. The combination comprising an independent powerless cargo carrying watercraft, an independent powered watercraft for pushing the cargo carrying watercraft, said cargo carrying watercraft comprising means defining an opened bottom well in its stern portion, the bow portion of said powered watercraft having a normal ship-shaped bow terminating in a stem and disposable in said well with said bow portion being adjacent to and spaced from said well-defining means, and selectively operable pivotal connecting means establishing a horizontal laterally extending pivot axis connecting between said stern portion and said bow portion for pivotally connecting said powered watercraft to said cargo carrying watercraft, said *cargo carrying craft including means which receive the connecting means and which have a top and bottom portion which are located and extend above and below the connecting means received therein to contact top and bottom portions of the connecting means to restrain and limit movement of the connecting means in the vertical direction, said connecting means in said receiving means providing a positive force transmitting connection between said cargo carrying watercraft and said powered watercraft operable during both forward and reverse movement of said powered watercraft, said selectively operable connecting means permitting free pivotal motion about said axis between said cargo carrying watercraft and said powered watercraft and being selectively operable to disconnect said powered watercraft from said cargo carrying watercraft.*

4. The combination as defined in claim [3] *2* wherein [said pin receiving means includes a block having a rubber member disposed therein and a passageway extending within said rubber member to receive said respective extended pin] *said side walls include a vertical slot, said respective pin receiving means being positioned and fixed in respective vertical slots to prevent vertical movement of the pins in the vertical slots during propulsion.*

17. A coupling combination between a first vessel and a second vessel comprising: a first vessel having a recess for receiving the end of a second vessel, said recess being sufficiently large to provide a clearance around the end of the second vessel therein received; side walls in said recess having opposed vertical slots extending into said side walls perpendicularly to the centerline of said second vessel, *each of said vertical slots including receiving means for a locking member which have a top and bottom portion which are located and extend above and below a locking member received therein to contact top and bottom portions of the locking member to restrain and limit movement of the locking member in the vertical direction;* and locking members on said second vessel for extending into and selectively engaging said [slots] *receiving means* when said end of said second vessel is within said recess, *said locking members permitting free pivotal motion between the first and second vessels about an axis extending through the locking members.*

18. A coupling combination between a first vessel and a second vessel comprising: a first vessel having a recess for receiving the end of a second vessel, said recess being sufficiently large to provide a clearance around the bow end of said second vessel therein received; said bow end of said second vessel being a normal ship-shaped bow terminating in a stem which is disposed in said recess; side walls in said recess having opposed openings extending into said side walls perpendicularly to the centerline of said second vessel; *each of said openings including receiving means for a locking member which have a top and bottom portion which are located and extend above and below a locking member received therein to contact top and bottom portions of the locking member to restrain and limit movement of the locking member in the vertical direction;* and locking members on said second vessel for extending into and selectively engaging said [openings] *receiving means* when said end of said second vessel is within said recess, said locking members permitting free pivotal motion between said first and second vessels about an axis extending through said locking members.

19. A coupling combination between a first vessel and a second vessel comprising a first vessel having a predetermined beam width and a recess adjacent its stern for receiving the bow end of a second vessel, said recess being sufficiently large to provide a clearance around said bow end of said second vessel therein received, said recess having a pair of opposed side walls, said second vessel having a beam width less than said predetermined beam width whereby said second vessel is spaced inwardly of each of the sides of said first vessel adjacent its said stern, said bow end of said second vessel having a pair of opposed side walls, opposed openings on respective said side walls of one of said vessels, *each of said openings including receiving means for a locking member which have a top and bottom portion which are located and extend above and below a locking member received therein to contact top and bottom portions of the locking member to restrain and limit movement of the locking member in the vertical directions,* locking members movable outwardly of respective said side walls of the other of said vessels, said locking members being extendable into and selectively engagable with said [openings] *receiving means* when said end of said second vessel is disposed in said recess, said locking members permitting free pivotal motion between said first and second vessels about an axis extending through said locking members.

20. A coupling combination between a first vessel and a second vessel comprising:
    a first vessel having a recess for receiving the end of a second vessel, said recess being sufficiently large to provide a clearance around the end of the second vessel therein received;
    side walls in said recess having opposed vertical slots extending into said side walls perpendicularly to the centerline of said second vessel;
    locking members on said second vessel for extending into said slots; and
    said slots including means therein [engaging] *which have a top and bottom portion which are located and extend across the slots above and below a locking member received therein for engaging top and bottom portions of the locking members for restraining and limiting vertical movement of* said members for transmitting longitudinal propulsive forces between said vessels when said end of said second vessel is within said recess.

25. The coupling combination of claim 17 wherein *the means* in said slots [are of sufficient width and depth to provide a clearance between said locking members and the walls of said slots when said locking members are in a fully extended position and are engaged in said] *are fixed to prevent vertical movement of the locking members in the vertical* slots.

26. A coupling combination for a tugboat and barge comprising:
    a barge having a recess in the stern thereof for receiving the forebody of a tugboat, said recess being sufficiently large to permit relative movement between said barge and said tugboat in pitching, heaving, and rolling motions;
    said walls in said recess having opposed vertical slots extending into said side walls perpendicularly to the centerline of said tugboat, *each of said slots including receiving means for a locking member which have a top and bottom portion which are located and extend above and below a locking member received therein to contact top and bottom portions of the locking member to restrain and limit movement of the locking member in the vertical direction*; and
    locking members on the sides of the forebody of said tugboat for extending into and selectively engaging said [slots] *receiving means* when said forebody of said tugboat is within said recess, *said locking members permitting free pivotal motion between the tugboat and barge about an axis extending through the locking members when the locking members are engaged by the receiving means.*

30. A coupling combination for a tugboat and barge for permitting said tugboat to propel and steer said barge comprising:
    a barge having a recess amid the stern thereof for receiving the floating forebody of a tugboat;
    side walls in said recess having opposed vertical slots which extend into said side walls perpendicularly to the centerline of said tugboat, *each of said slots including receiving means for a locking member which have a top and bottom portion which are located and extend across the slots above and below a locking member received therein to contact top and bottom portions of the locking member to restrain and limit movement of the locking member in the vertical direction*;
    locking members on each side of the forebody of said tugboat which locking members can be extended along a line perpendicular to the centerline of said tugboat to engage said [vertical slots] *receiving means*; and
    said recess in said barge being wider than the greatest abeam measurement on the forebody of said tugboat and being sufficiently deep to provide a clearance between the bow of said tugboat and the forward wall of the recess when the forebody of said tugboat is received in said recess and said locking members are engaging said [vertical slots,] *receiving means* to permit freedom of movement between said tugboat and said barge in pitching, heaving, and rolling motions.

31. A coupling combination between a first vessel and a second vessel comprising a first vessel having a recess for receiving the end of a second vessel, said recess being sufficiently large to provide a clearance around the end of the second vessel therein received and being bounded by side walls, said side walls having wall portions forming opposed vertical slots extending inwardly into the first vessel, said slot wall portions extending perpendicularly to the centerline of said second vessel, each of said slots including receiving means for a *locking member which have a top and bottom portion which are located and extend above and below a locking member received therein to contact top and bottom portions of the locking member to restrict and limit movement of the locking member in the vertical direction,* and locking members on said second vessel for extending into and selectively operably cooperating with said [slot wall portions] *receiving means* for transmitting longitudinal propulsive forces between said vessels when said end of said second vessel is within said recess, *said locking members permitting free pivotal motion between the first and second vessels about an axis extending through the*

*locking members when the locking members are engaged by the receiving means.*

32. A coupling combination between a first vessel and a second vessel comprising a first vessel having a recess for receiving one end of a second vessel, said recess being sufficiently large to provide a clearance around said one end of said second vessel therein received and being bounded by a pair of side walls, said one end of said second vessel having a pair of side walls, one said pair of side walls on one of said vessels having respective opposed vertical slot openings extending thereinto, *each of said slots including receiving means for a locking member which have a top and bottom portion which are located and extend above and below a locking member received therein to contact top and bottom portions of the locking member to restrain and limit movement of a locking member in the vertical direction,* a pair of vertical spaced walls extending perpendicularly to the centerline of said vessels and inwardly of each said slot openings, and [means] *locking members* on the other of said vessels movable outwardly of respective said side walls of said other vessel and extending [through] *into* each of said [slot openings] *receiving means*, said means operably cooperating with said vertical walls for transmitting longitudinal propulsive forces *and permitting pivotal movement* between said vessels when said one end of said second vessel is disposed in said recess.

33. The coupling combination of claim [17 further comprising means within said slot for operably maintaining said locking members within said slots when said end of said second vessel is within said recess and said locking members extend into said slots] *32 wherein the receiving means are fixed to prevent vertical movement of the locking members in the vertical slots during propulsion.*

34. The combination comprising an independent powerless cargo carrying watercraft, an independent powered watercraft for pushing the cargo carrying watercraft, said cargo carrying watercraft having a well in its stern portion, the bow portion of said powered watercraft being disposed in said well of said stern portion of said cargo carrying watercraft, and selectively operable means disposed between said well and said bow portion for connecting said powered watercraft to said cargo carrying watercraft, said means providing positive connection between said cargo carrying watercraft and said powered watercraft during forward and reverse movement of said powered watercraft, said selectively operable means including a pair of connecting pins respectively disposed on the port and starboard sides of said bow portion of said powered watercraft, said pins being extendable laterally outward of said bow portion and retractable inward of said bow portion, said well within said stern portion of said cargo carrying watercraft having a pair of opposed side walls, said side walls having a respective pin receiving means disposed therein in general horizontal alignment with each other, each said connecting pin nesting in respective said pin receiving means when said pins are extended laterally outward from said bow portion of said powered watercraft, said pin receiving means including a hard rubber core having a passageway therein and a metal casing surrounding said core, said casing being connected to said side wall, a thin metal sleeve circumferentially surrounding said passageway providing a bearing surface for said extended pin *which surrounds the extended pin to restrain and limit movement of the extended pin in the vertical direction*, said rubber core being yieldable to permit a limited universal motion between said powerless cargo carrying watercraft and said powered watercraft, *and means to restrain and limit movement of said pin receiving means in the vertical direction.*

*37. The coupling combination of claim 17 wherein the receiving means is fixed in respective vertical slots to prevent vertical movement of the locking member in the vertical slots during propulsion.*

* * * * *